(12) United States Patent
Kim et al.

(10) Patent No.: US 8,509,324 B2
(45) Date of Patent: Aug. 13, 2013

(54) METHODS AND SYSTEMS FOR REDUCING PAPR OF AN OFDM SIGNAL

(75) Inventors: Je Woo Kim, Cupertino, CA (US); Ayman Fawzy Naguib, Cupertino, CA (US); Jong Hyeon Park, San Jose, CA (US); Tae Ryun Chang, Santa Clara, CA (US)

(73) Assignee: QUALCOMM Incorporated, San Diego, CA (US)

( * ) Notice: Subject to any disclaimer, the term of this patent is extended or adjusted under 35 U.S.C. 154(b) by 937 days.

(21) Appl. No.: 12/169,625

(22) Filed: Jul. 8, 2008

(65) Prior Publication Data

US 2010/0008432 A1 Jan. 14, 2010

(51) Int. Cl.
*H04K 1/10* (2006.01)

(52) U.S. Cl.
USPC .......................................... 375/260; 375/295

(58) Field of Classification Search
USPC ................. 375/260, 285, 296, 346, 230, 299; 370/342, 344
See application file for complete search history.

(56) References Cited

U.S. PATENT DOCUMENTS

| 7,224,742 | B2 | 5/2007 | Cleveland et al. | |
|---|---|---|---|---|
| 7,342,978 | B2 | 3/2008 | Feng et al. | |
| 7,609,782 | B2 * | 10/2009 | Giannakis et al. | 375/299 |
| 7,873,021 | B2 * | 1/2011 | Petre et al. | 370/342 |
| 2004/0141458 | A1 | 7/2004 | Park et al. | |
| 2007/0189404 | A1 * | 8/2007 | Baum et al. | 375/260 |
| 2007/0253476 | A1 * | 11/2007 | Tirkkonen et al. | 375/230 |
| 2008/0075191 | A1 * | 3/2008 | Haartsen | 375/285 |

FOREIGN PATENT DOCUMENTS

| EP | 1780925 A2 | 5/2007 |
|---|---|---|
| KR | 100484447 B1 | 4/2005 |
| RU | 2280953 C2 | 7/2006 |
| RU | 2313910 C2 | 12/2007 |
| WO | WO2006014141 | 2/2006 |
| WO | 2008037739 A2 | 4/2008 |
| WO | WO2008042189 A1 | 4/2008 |
| WO | 2008078357 A1 | 7/2008 |

OTHER PUBLICATIONS

International Search Report and Written Opinion—PCT/US2009/049880, International Search Authority, European Patent Office, Nov. 5, 2009.

Takebayashi A., et al., "A Study on PAPR Reduction for Single-and Multi-Carrier Communication Systems," Technical Report of the Institute of Electronics, Information and Communication Engineers, Aug. 20, 2008, vol. 108, No. 188, pp. 139-144, RCS2008-76.

Taiwan Search Report—TW098123094—TIPO—Jan. 10, 2013.

* cited by examiner

*Primary Examiner* — Daniel Washburn
*Assistant Examiner* — Fitwi Hailegiorgis
(74) *Attorney, Agent, or Firm* — Tyler J. Overall

(57) ABSTRACT

Certain embodiments of the present disclosure provide a method and an apparatus for peak-to-average power ratio (PAPR) reduction of a transmission signal in a single carrier frequency division multiple access (SC-FDMA) system. The method may utilize a permutation of a time domain signal, and/or a permutation of a frequency domain signal or a permutation of a signal transformed by a unitary matrix. The apparatus may include an M-point DFT or some other M×M unitary matrix, N-point IDFT, interpolation and frequency conversion units, and a pair of possibly different permutation matrices of size M×M, where M can be less or equal than N.

32 Claims, 14 Drawing Sheets

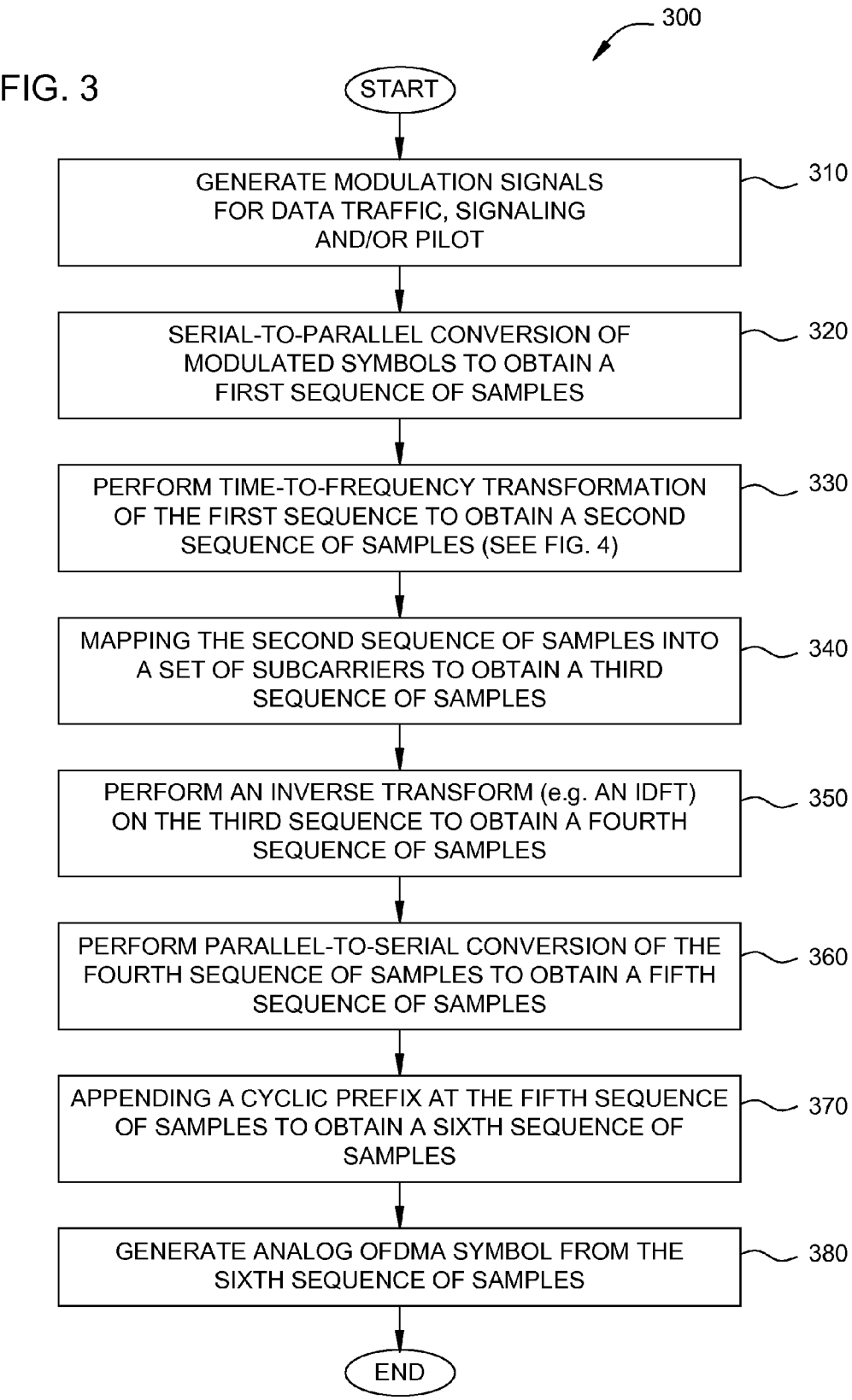

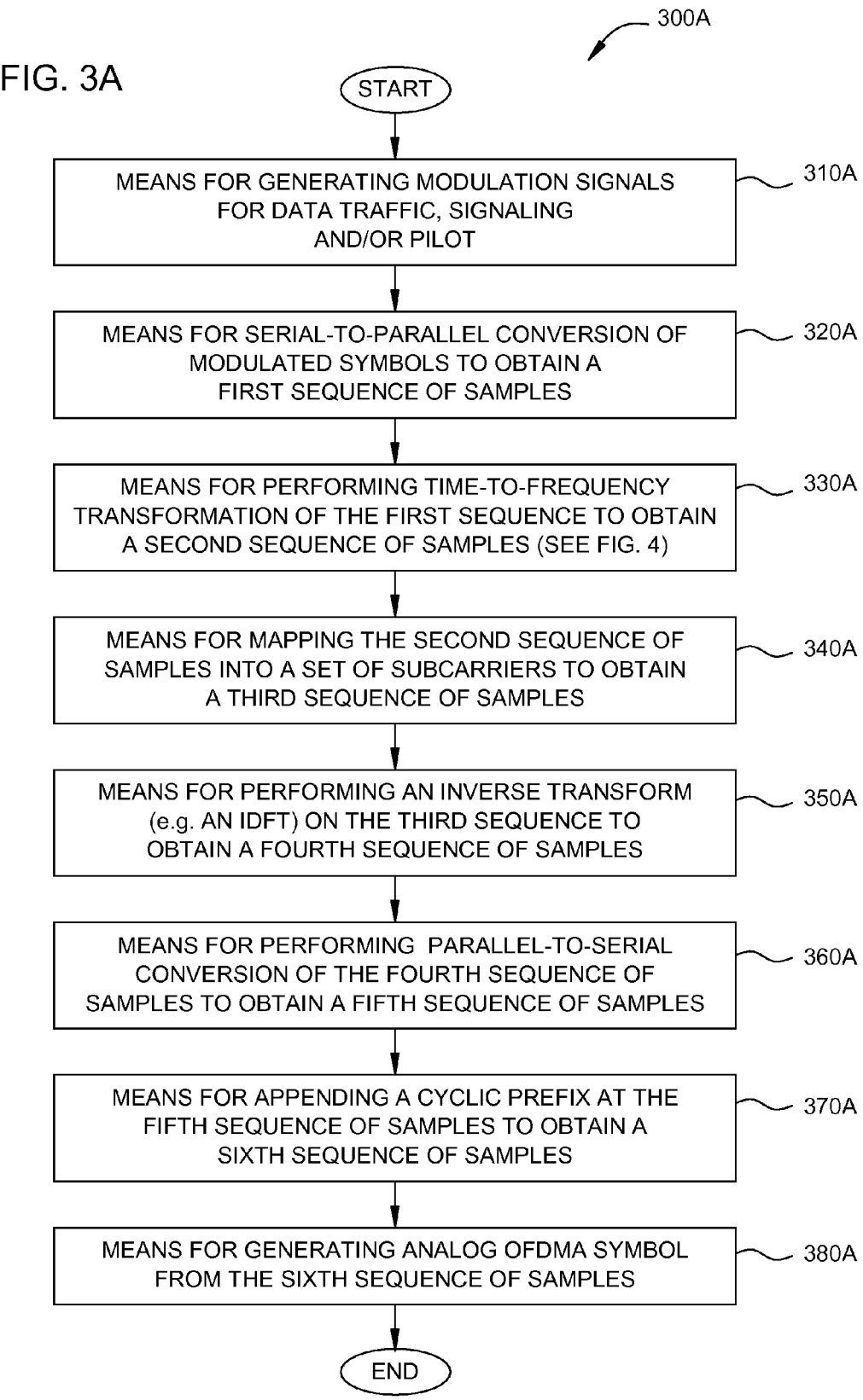

$$U = \begin{bmatrix} e^{jU_0^0} & e^{jU_0^1} & e^{jU_0^2} & \cdots & \cdots & e^{jU_0^{K-1}} \\ e^{jU_1^0} & e^{jU_1^1} & e^{jU_1^2} & \cdots & \cdots & e^{jU_1^{K-1}} \\ e^{jU_2^0} & e^{jU_2^1} & e^{jU_2^2} & \cdots & \cdots & e^{jU_2^{K-1}} \\ \cdot & \cdot & \cdot & \cdot & \cdot & \cdot \\ \cdot & \cdot & \cdot & \cdot & \cdot & \cdot \\ e^{jU_{M-1}^0} & e^{jU_{M-1}^1} & e^{jU_{M-1}^2} & \cdots & \cdots & e^{jU_{M-1}^{K-1}} \end{bmatrix}$$

where $U_k^i = \frac{2p}{M} ki$

FIG. 6

$$P = \begin{bmatrix} 1 & 0 & 0 & \cdot & \cdot & 0 \\ \cdot & \cdot & \cdot & \cdot & \cdot & \cdot \\ \cdot & \cdot & \cdot & \cdot & \cdot & \cdot \\ 0 & 0 & 0 & \cdot & \cdot & 0 \\ 0 & 0 & 1 & \cdot & \cdot & 0 \\ 0 & 1 & 0 & \cdot & \cdot & 0 \end{bmatrix}$$

FIG. 7

| SIMULATION SETUP | P(i) | UNITARY/DFT POINT | P(j) | IDFT POINT | x16 INTERPOLATION REQUIRED |
|---|---|---|---|---|---|
| M1 | NO | NO | NO | 1024 | NO |
| M2 | NO | 64 DFT | NO | 1024 | NO |
| M3 | YES | 64 UNITARY | YES | 1024 | NO |
| P1 | NO | NO | NO | 64 | YES |
| P2 | NO | 64 UNITARY | NO | 64 | YES |
| P3 | NO | 64 DFT | NO | 64 | YES |
| P4 | NO | 64 DFT | YES | 64 | YES |
| P5 | YES | 64 UNITARY | YES | 64 | YES |
| P6 | NO | 64 DFT | YES | 64 | YES (x16 INT FILTER INCLUDED) |

FIG. 8

| SIMULATION SETUP | PAPR(dB) at CCDF(%)=$10^{-3}$ | | | |
|---|---|---|---|---|
| | BPSK | QPSK | 16QAM | 64QAM |
| M1 | 11.6577 | 10.7315 | 10.6847 | 10.4042 |
| M2 | 8.3150 | 7.3507 | 8.3979 | 8.2810 |
| M3 | 5.3352 | 6.7597 | 7.7300 | 7.9310 |
| P1 | 11.0887 | 11.0067 | 11.0887 | 10.5606 |
| P2 | 6.9943 | 6.4156 | 7.8317 | 7.8764 |
| P3 | 6.9930 | 6.4480 | 7.7697 | 7.8755 |
| P4 | 3.7519 | 5.7714 | 7.3092 | 7.6780 |
| P5 | 3.7433 | 5.6805 | 7.0938 | 7.4483 |
| P6 | 3.7191 | 5.6623 | 7.1522 | 7.4893 |

FIG. 9

METHODS AND SYSTEMS FOR REDUCING PAPR OF AN OFDM SIGNAL

TECHNICAL FIELD

The present disclosure generally relates to wireless communications and, more particularly, to reducing peak-to-average power ratio (PAPR) of an orthogonal frequency division multiplexing (OFDM) signal.

BACKGROUND

Orthogonal frequency division multiplexing (OFDM) is a multi-carrier multiplexing scheme that partitions a frequency band (e.g., the system-bandwidth) into multiple (N) orthogonal subbands. These subbands are also called tones, subcarriers, bins, and so on. With OFDM, each subband is associated with a respective subcarrier that may be independently modulated with data.

OFDM has certain desirable characteristics such as high spectral efficiency and robustness against multipath effects. However, a major drawback with OFDM is a high peak-to-average power ratio (PAPR), which means that the ratio of the peak power to the average power of an OFDM waveform can be high. The high PAPR for the OFDM waveform results from possible in-phase addition of all the subcarriers when they are independently modulated with data. In fact, it can be shown that the peak power can be up to N times greater than the average power.

The high PAPR for the OFDM waveform is undesirable and may degrade performance. For example, large peaks in the OFDM waveform may cause a power amplifier at the transmitter to operate in a highly non-linear region or possibly clip, which would then cause intermodulation, distortion and other artifacts that can degrade signal quality. The degraded signal quality may adversely affect performance for channel estimation, data detection, and so on.

There is therefore a need in the art for a transmission scheme that provides good performance and does not have a high PAPR.

SUMMARY

Certain embodiments provide a method for transmitting data in a wireless communication system using orthogonal frequency division multiplexing (OFDM). The method generally includes performing a serial to parallel conversion of modulated symbols for the data to obtain a first sequence of samples, performing a time-to-frequency transformation of the first sequence of samples to obtain a second sequence of samples, wherein the time-to-frequency transformation comprises performing a first permutation of the first sequence of samples to obtain a permuted sequence of samples, performing a transformation involving a unitary matrix on the permuted sequence of samples to obtain a transformed sequence of samples, and performing a second permutation of the transformed sequence of samples to obtain the second sequence of samples, and generating an OFDM symbol for transmission from the second sequence of samples.

Certain embodiments provide a transmitter for wireless communications using orthogonal frequency division multiplexing (OFDM). The transmitter generally includes logic for performing a serial to parallel conversion of modulated symbols for the data to obtain a first sequence of samples. logic for performing a time-to-frequency transformation of the first sequence of samples to obtain a second sequence of samples, wherein the time-to-frequency transformation comprises performing a first permutation of the first sequence of samples to obtain a permuted sequence of samples, performing a transformation involving a unitary matrix on the permuted sequence of samples to obtain a transformed sequence of samples, and performing a second permutation of the transformed sequence of samples to obtain the second sequence of samples, and logic for generating an OFDM symbol for transmission from the second sequence of samples.

Certain embodiments provide an apparatus for wireless communications using orthogonal frequency division multiplexing (OFDM). The apparatus generally includes means for performing a serial to parallel conversion of modulated symbols for the data to obtain a first sequence of samples, means for performing a time-to-frequency transformation of the first sequence of samples to obtain a second sequence of samples, wherein the time-to-frequency transformation comprises performing a first permutation of the first sequence of samples to obtain a permuted sequence of samples, performing a transformation involving a unitary matrix on the permuted sequence of samples to obtain a transformed sequence of samples, and performing a second permutation of the transformed sequence of samples to obtain the second sequence of samples, and means for generating an OFDM symbol for transmission from the second sequence of samples.

Certain embodiments provide a computer-readable medium containing a program for transmitting data in a wireless communication system using orthogonal frequency division multiplexing (OFDM). When executed by a processor, the program performs operations generally including performing a serial to parallel conversion of modulated symbols for the data to obtain a first sequence of samples, performing a time-to-frequency transformation of the first sequence of samples to obtain a second sequence of samples, wherein the time-to-frequency transformation comprises performing a first permutation of the first sequence of samples to obtain a permuted sequence of samples, performing a transformation involving a unitary matrix on the permuted sequence of samples to obtain a transformed sequence of samples, and performing a second permutation of the transformed sequence of samples to obtain the second sequence of samples, and generating an OFDM symbol for transmission from the second sequence of samples.

Certain embodiments provide a computer-program product for processing data for transmission in a wireless communication system using orthogonal frequency division multiplexing (OFDM) comprising a computer readable medium having a set of instructions stored thereon, the set of instructions being executable by one or more processors. The set of instructions can include: instructions for performing a serial to parallel conversion of modulated symbols for the data to obtain a first sequence of samples, instructions for performing a time-to-frequency transformation of the first sequence of samples to obtain a second sequence of samples, and instructions for generating an OFDM symbol for transmission from the second sequence of samples. The instructions for performing the time-to-frequency transformation can include: instructions for performing a first permutation of the first sequence of samples to obtain a permuted sequence of samples, instructions for performing a transformation involving a unitary matrix on the permuted sequence of samples to obtain a transformed sequence of samples, and instructions for performing a second permutation of the transformed sequence of samples to obtain the second sequence of samples;

BRIEF DESCRIPTION OF THE DRAWINGS

So that the manner in which the above recited features of the present disclosure can be understood in detail, a more particular description, briefly summarized above, may be had by reference to embodiments, some of which are illustrated in the appended drawings. It is to be noted, however, that the appended drawings illustrate only certain typical embodiments of this disclosure and are therefore not to be considered limiting of its scope, for the description may admit to other equally effective embodiments.

FIG. 3 illustrates example operations for generating an OFDMA signal according to SC-FDMA;

FIG. 3A illustrates example components capable of performing the operations illustrated in FIG. 3;

FIG. 6 illustrates an example Vandermonde unitary matrix of size M×K that may be utilized in certain embodiments of the present disclosure;

FIG. 7 illustrates an example baseline cyclic permutation matrix that may be utilized in certain embodiments of the present disclosure;

FIG. 8 illustrates a table illustrating example configurations for simulating results in reducing PAPR in accordance with certain embodiments of the present disclosure;

FIG. 9 illustrates a table that summarizes example PAPR measurement results for different simulation configurations;

DETAILED DESCRIPTION

The word "exemplary" is used herein to mean "serving as an example, instance, or illustration." Any embodiment described herein as "exemplary" is not necessarily to be construed as preferred or advantageous over other embodiments.

Figure 1:
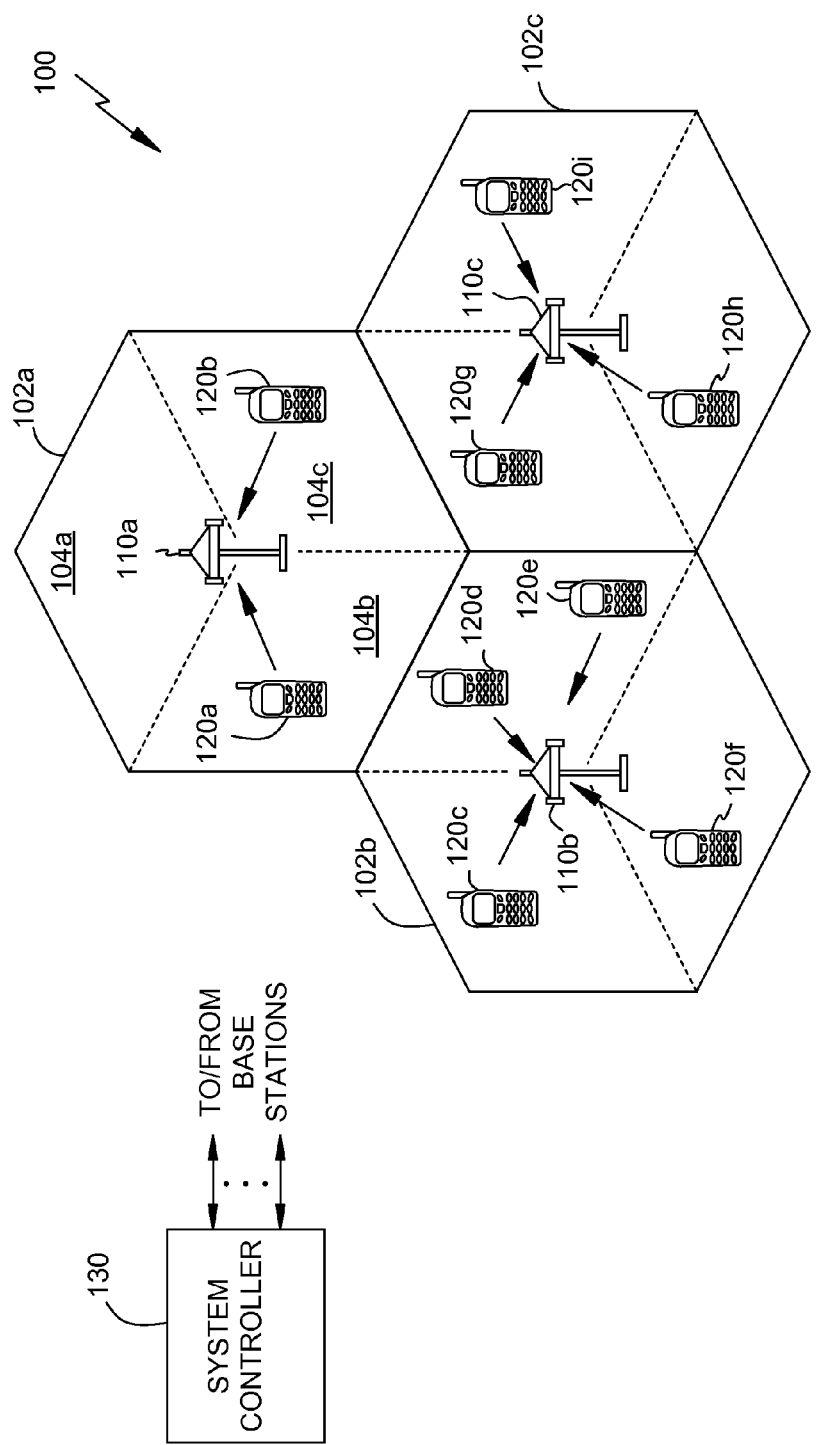
FIG. 1 illustrates a wireless communication system.

FIG. 1 shows a wireless communication system 100 with multiple base stations 110 and multiple terminals 120. A base station is generally a fixed station that communicates with the terminals and may also be called an access point, a Node B or some other terminology. Each base station 110 provides communication coverage for a particular geographic area 102. The term "cell" can refer to a base station and/or its coverage area depending on the context in which the term is used. To improve system capacity, a base station coverage area may be partitioned into multiple smaller areas, e.g., three smaller areas 104a, 104b, and 104c. These smaller areas are defined by different antenna beams formed by multiple antennas for the base station. Each smaller area is served by a respective base transceiver subsystem (BTS). The term "sector" can refer to a BTS and/or its coverage area depending on the context in which the term is used. For a sectorized cell, the BTSs for all sectors of that cell are typically co-located within the base station for the cell.

Terminals 120 are typically dispersed throughout the system, and each terminal may be fixed or mobile. A terminal may also be called a mobile station, user equipment, or some other terminology. A terminal may be a wireless device, a cellular phone, a personal digital assistant (PDA), a wireless modem card, and so on. Each terminal may communicate with one or possibly multiple base stations on the forward and reverse links at any given moment. The forward link (or downlink) refers to the communication link from the base stations to the terminals, and the reverse link (or uplink) refers to the communication link from the terminals to the base stations. For simplicity, FIG. 1 shows only transmissions from the terminals on the reverse link.

In some embodiments, a system controller 130 couples to base stations 110 and provides coordination and control for these base stations. For a distributed architecture, the base stations may communicate with one another as needed.

System 100 may utilize single-carrier frequency division multiple access (SC-FDMA), orthogonal frequency division multiple access (OFDMA), and/or some other multiplexing scheme. SC-FDMA includes interleaved FDMA (IFDMA) which transmits data on subbands that are distributed across a frequency band, localized FDMA (LFDMA) which transmits data on a group of adjacent subbands, and enhanced FDMA (EFDMA) which transmits data on multiple groups of adjacent subbands. IFDMA is also called distributed FDMA, and LFDMA is also called narrowband FDMA, classical FDMA, and FDMA. OFDMA utilizes OFDM. Modulation symbols are sent in the time domain with IFDMA, LFDMA and EFDMA and in the frequency domain with OFDM. In general, system 100 may utilize one or more multiplexing schemes for the forward and reverse links. For example, system 100 may utilize (1) SC-FDMA (e.g., IFDMA, LFDMA or EFDMA) for both the forward and reverse links (2) one version of SC-FDMA (e.g., EFDMA) for one link and another version of SC-FDMA (e.g., IFDMA) for the other link, (3) SC-FDMA for the reverse link and OFDMA for the forward link, or (4) some other combination of multiplexing schemes. SC-FDMA, OFDMA, and/or some other multiplexing scheme, or a combination thereof may be used for each link to achieve the desired performance. For example, SC-FDMA and OFDMA may be used for a given link, with SC-FDMA being used for some subbands and OFDMA being used on other subbands. It may be desirable to use SC-FDMA on the reverse link to achieve lower PAPR and to relax the power amplifier requirements for the terminals. It may be desirable to use OFDMA on the forward link to potentially achieve higher system capacity.

In a generic OFDM transmitter, the input data X[k], k=0, 1, . . . , N−1, are transmitted within a single OFDM symbol period. After the serial/parallel transformation, N-point inverse discrete Fourier transform (N-IDFT), and parallel/serial transformation, the input data are transformed into the following discrete time sequence:

$$x[n] = \frac{1}{\sqrt{N}} \sum_{k=0}^{N-1} X[k] W_N^{kn}, \quad n = 0, 1, \ldots, N-1, \quad (1)$$

where $W_N = e^{j2\pi/N}$ is the rotation factor.

The discrete time sequence x[n] obtained from equation (1) undergoes the cyclic prefix insertion and digital-to-analog transformation to obtain an analog signal x(t). The analog signal is then transmitted to the radio frequency (RF) front end for further processing, including an IQ modulation, an up conversion, and power amplification. The PAPR of the analog signal x(t) can be defined as (in dB units):

$$PAPR = 10\log_{10} \frac{\max_{0 \le t \le NT} |x(t)|^2}{\frac{1}{NT}\int_0^{NT} |x(t)|^2 \, dt} \text{(dB)}, \quad (2)$$

where T is a time duration of sample X[k], N·T is a time duration of an OFDM block, and $$\frac{1}{NT}$$

represents frequency spacing between adjacent subcarriers.

The PAPR of the analog signal x(t) is typically several dB units higher than the PAPR of the corresponding discrete time sequence x[n], and is close to the PAPR of x[n/L], where x[n/L] represents the sequence obtained by L times oversampling of x[n]. Therefore, the PAPR of analog signal x(t) can be approximated by using discrete time sequence x[n/L] as follows:

$$PAPR = 10\log_{10} \frac{\max_{0 \le n \le RN-1} |x[n/L]|^2}{E\{|x[n/L]|^2\}} \text{(dB)}, \quad (3)$$

where E{*} is the expectation operation. The approximation is sufficiently accurate if L≧4.

One of the main disadvantages of multicarrier communication systems is the high PAPR of the modulated signal. When the modulated signal with a high PAPR passes through the RF front end, the signal may be distorted due to the non-linearity of an RF power amplifier. The non-linearity of a power amplifier not only causes the in-band signal distortion which leads to the increase of the bit error rate (BER), but may also cause the out-of-band radiation which leads to the interference of adjacent channels. A straightforward solution to this problem would be to utilize an RF amplifier with a larger linear region. However, the aforementioned solution leads to a reduction of power efficiency, higher power consumption and a higher manufacturing cost.

In order to decrease the PAPR, various methods may be utilized, such as variants of OFDM like SC-FDMA, offset DFT-S-OFDM (DFT spread OFDM) and precoded DFT-S-OFDM are provided. In these methods of modifying OFDM signal generation, PAPR characteristics of a transmission signal are enhanced in a manner of spreading a transmission data vector by DFT before mapping data to subcarriers in a frequency domain. In the methods of modifying OFDM signal generation, it is in common that a signal is spread by DFT. In particular, since the data signal mapped by the subcarriers is performed by IDFT at a final transmission step, the contribution of signals having peak powers may be cancelled out to reduce a power variation of the final transmission signal.

Figure 2:
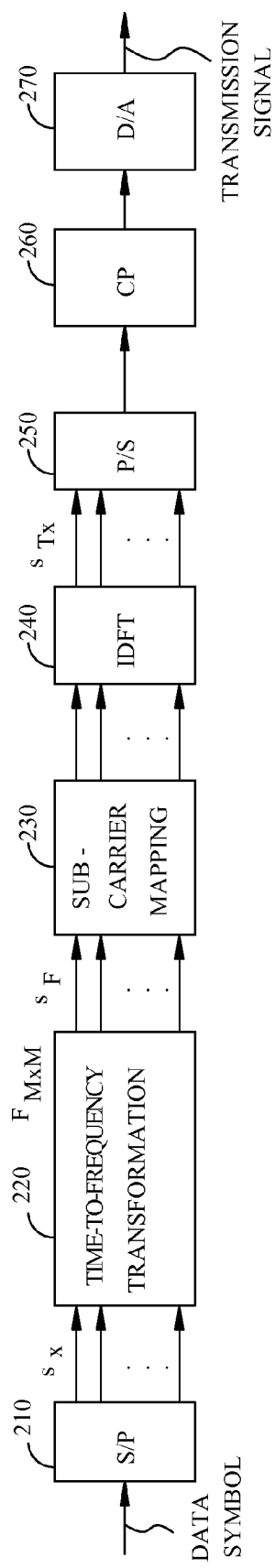
FIG. 2 illustrates a block diagram of an OFDMA signal generator according to SC-FDMA.

FIG. 2 illustrates a block diagram of example components for OFDM signal generation. The illustrated components may be utilized in systems that comply with a variety of different standards or proposed standards. For example, for certain embodiments, the illustrated components may support transmission in the reverse link of the 3-rd Generation Partnership Project Long Term Evolution (3GPP-LTE) SC-FDMA system.

Referring to FIG. 2, a serial-to-parallel converting unit 210 converts a data symbol inputted in series to a parallel signal. A unit 220 performs time-to-frequency transformation (or spreading) on the paralleled data symbol, for example, using Discrete Fourier Transform (DFT), which generates an OFDM signal. Equation (4) indicates a method of spreading a parallel signal using the DFT matrix of size M×M.

$$s_F = F_{M \times M} \cdot s_x \quad (4)$$

In equation (4), M indicates the number of subcarriers provided to an OFDM signal, $s_x$ indicates a data symbol vector, and $s_F$ indicates a vector of which data is spread in a frequency domain. Moreover, $F_{M \times M}$ is a DFT matrix of size M×M.

A subcarrier mapping unit 230 maps the spread vector $s_F$ to subcarriers using one of the previously specified allocating patterns. An Inverse Discrete Fourier Transform (IDFT) unit 240 transforms the signal mapped to the subcarrier into a signal in a time domain. Equation (5) represents Inverse Discrete Fourier Transform.

$$s_{Tx} = F_{N \times N}^{-1} \cdot s_F \quad (5)$$

In equation (5), $s_F$ is N×1 vector and $F_{N \times N}^{-1}$ represents N×N IDFT matrix used to transform a signal in a frequency domain into a signal in a time domain and $s_{Tx}$ is a signal generated in a time domain by IDFT. A parallel-to-serial converting unit 250 converts a parallel time domain signal into a serial signal. A cyclic prefix inserting unit 260 inserts a cyclic prefix (CP) in a serial signal to avoid interference between successive OFDMA symbols. Conversion of the signal from a discrete to an analog waveform is performed by the digital-to-analog conversion unit (D/A unit 270), and then the signal is up converted, power amplified and transmitted.

FIG. 3 illustrates example operations 300 for generating an OFDMA signal in the reverse link of the SC-FDMA system (transmission from user terminal to base station). Modulation symbols are generated (e.g., for traffic data, signaling, pilot or a combination thereof), at 310. Then, modulated symbols are converted from a serial to a parallel stream to obtain a first sequence of samples, at 320.

A time-to-frequency transformation is applied on the first sequence of samples to obtain a second sequence of transformed samples, at 330. Mapping of the second sequence of transformed samples to a set of subcarriers using one of the aforementioned allocating patterns is performed to obtain a third sequence of samples, at 340. An inverse transform (e.g., an IDFT) is performed on the third sequence to obtain a fourth sequence of samples, at 350, which is effectively a discrete time domain signal.

The parallel-to-serial conversion is applied on the fourth sequence of samples to obtain a fifth sequence of serial samples, at 360. In order to avoid an interference between consecutively transmitted OFDMA symbols, a cyclic prefix is appended, at 370, and a sixth sequence of samples is obtained. The resulting sequence of samples represents a discrete version of an OFDMA symbol. Before the transmission, an analog waveform of an OFDMA symbol is generated, at 380, and the signal is up converted and power amplified before the transmission.

Although the illustrated SC-FDMA system may decrease PAPR compared to generic OFDM systems, for certain embodiments, PAPR may be further reduced by applying the cyclic permutations and by transforming the transmission signal with a unitary matrix of special kind. These particular transformations can be an integral part of a time-to-frequency transformation illustrated by block 220 in FIG. 2, and at 330 in FIG. 3.

Figure 4:
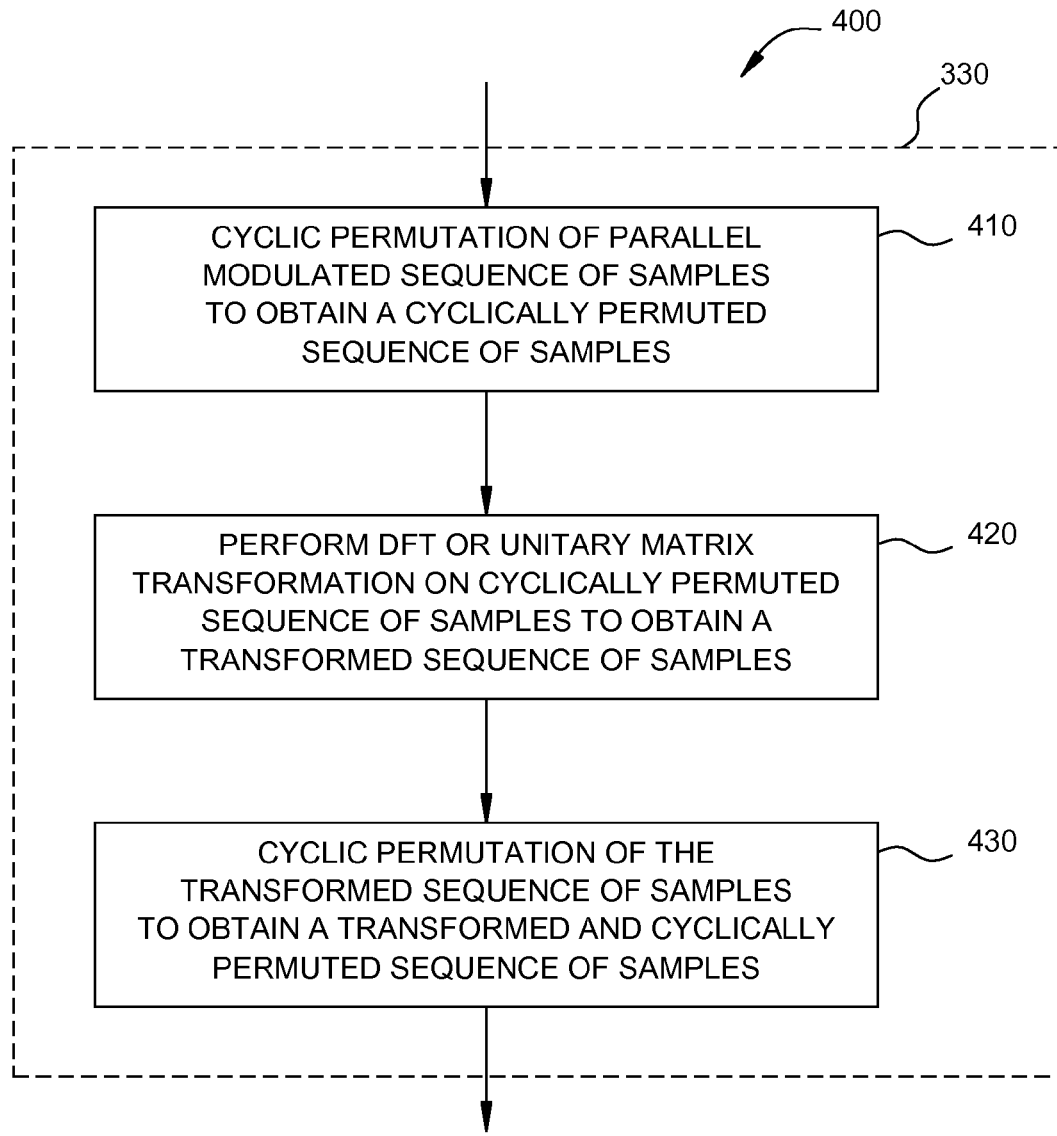
FIG. 4 illustrates example operations for generating a cyclically permuted (CyP) OFDMA signal with reduced PAPR according to Single Carrier Frequency Division Multiple Access (SC-FDMA)

FIG. 4 illustrates example operations 400 of a time-to-frequency transformation composed of multiple subparts. First, a parallel sequence of samples may be cyclically permuted, at 410. In one embodiment, the M-point DFT is then applied to transform a cyclically permuted time domain signal into a frequency version, at 420. In certain embodiments, a unitary matrix, such as the Vandermonde matrix of size M×M illustrated in FIG. 6, may be applied on a time domain signal to obtain a transformed signal. The DFT operation may also be viewed as a method to apply a unitary matrix of specific kind. A transformed signal may also be cyclically permuted after applying a unitary matrix, at 430, before conversion back into a time domain.

As a result of a multiplication with a unitary matrix, the transformed transmission signal after being converted back in a time domain by the IDFT has a constant envelope and hence an improvement in PAPR characteristics is attained. The application of cyclic permutation matrices reduces the incidence of zero crossing in a time domain signal, which further reduces the PAPR of the signal being transmitted.

Figure 5:
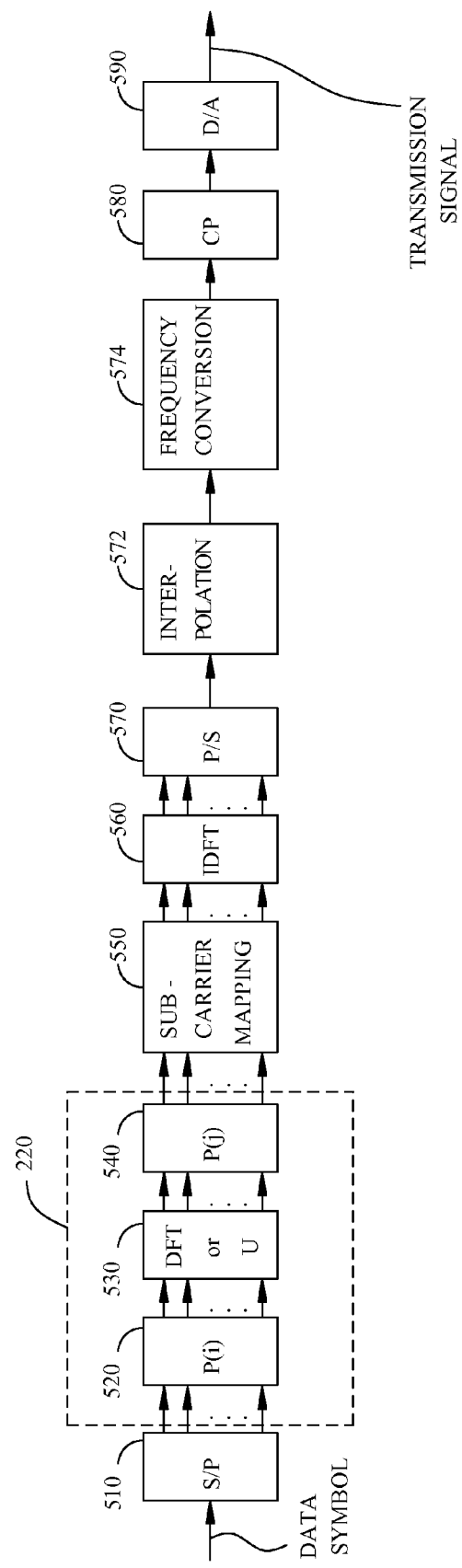
FIG. 5 illustrates a block diagram of an example CyP OFDMA signal generator in accordance with certain embodiments of the present disclosure.

FIG. 5 illustrates a block structure of components for generating a cyclically permuted OFDMA signal for the transmission in a reverse link according to SC-FDMA. This structure is referred to herein as a Cyclically Permuted Orthogonal Frequency Division Multiple Access (CyP-OFDMA) transmission system.

A cyclic permutation of the transmission signal may provide significant improvement of PAPR characteristics for certain types of modulation schemes, for example, in the case of BPSK modulation. However, other types of permutations may result in better PAPR performance, for example, if QPSK or QAM modulation is applied at the transmitter. Therefore, transmission signals may be permuted with any suitable type permutation, which may be selected in an effort to achieve optimal performance for a particular modulation scheme. The disclosure before will refer to cyclic permutation (CyP) as a particular, but not limiting, example of a type of permutation.

Referring to FIG. 5, a serial-to-parallel converting unit 510 converts a data symbol inputted in series to a parallel signal. A parallel signal may be permuted in unit 520 by the cyclic permutation matrix P(i) illustrated in FIG. 7. The cyclically permuted signal may then be transformed, for example, by an M×M unitary matrix (e.g., the Vandermonde unitary matrix of FIG. 6), or by an M-point DFT (530).

The transformed signal in a frequency domain may be also cyclically permuted by the cyclic permutation matrix P(j) (540), where the shift index j may be same or different than index i of the cyclic permutation matrix P(i) applied on a signal in a time domain. The cyclically permuted samples in a frequency domain are then mapped to subcarriers (unit 550) according to chosen subcarrier allocating pattern.

An N-point IDFT transforms mapped subcarrier samples into a signal in a time domain (unit 560). A parallel-to-serial conversion unit 570 transforms a parallel signal converted in a time domain into a serial signal. An interpolation is performed by unit 572 if the size of DFT (or, equivalently, the size of alternative unitary matrix) and the size of IDFT are identical and smaller than the size of transmitted signal (for example, if M=N=64 instead of 1024 modulated symbols).

If the center frequency of a time domain signal is different than zero, a frequency conversion is also required which is performed by unit 574. A cyclic prefix inserting unit 580 includes a cyclic prefix in a signal to avoid interference between consecutive OFDMA symbols. A conversion of an OFDMA signal from a discrete to an analog waveform is performed by the D/A unit 590. After that an analog signal is up converted and power amplified before the transmission.

A generic Vandermonde unitary matrix of size M×K that may be utilized for transformation of a time domain signal in the CyP-OFDMA transmitter is illustrated in FIG. 6. A baseline cyclic permutation matrix P is defined in FIG. 7, illustratively, where $P(i)=P^i$. The values of indices of applied cyclic permutation matrices, i and j, may be determined by simulations such that these values result in the minimum PAPR for a particular modulation type. In one embodiment these indices may be fixed over a plurality of OFDMA symbols for the particular modulation type. In another embodiment indices may vary from one OFDMA symbol to another which depends on a quality of the channel between transmitter and receiver. In this way, PAPR can be further reduced by introducing some additional computational complexity. In yet another embodiment, indices of cyclic permutation matrices may be determined as a tradeoff between a level of PAPR reduction at the transmitter and computational complexity overhead required for updating of their values.

Simulations may be performed in order to estimate and compare the PAPR in different communication systems. FIG. 8 summarizes various simulation configurations, labeled M1-M3 and P1-P6. As illustrated, a DFT and an IDFT may have same or different size. Some other unitary matrix other than the DFT or the Vandermonde matrix may also be utilized. Different combinations of cyclic permutation matrices may be applied before and/or after the DFT (equivalently, before and after transformation with a unitary matrix). For example, in the case when M=N=64 (a DFT and an IDFT are of the same size) a parallel-to-serially converted signal is interpolated to obtain the desired size of a time domain signal, which is in this exemplary case equal to 1024 modulated symbols.

For the simulation setups labeled as P1-P5 in FIG. 8, the PAPRs are measured without the x16 interpolation filter (filter where the size of interpolated signal is 16 times larger than the size of a signal at the input of the filter). The x16 interpolation filter is applied in the simulation setup labeled as P6.

FIG. 9 shows a summary of PAPR measurements at $1-CDF(\%)=10^{-3}$ for different simulation configurations and different modulation techniques. The complementary cumulative distribution function (CCDF) that is used to evaluate PAPR performance may be defined as:

CCDF=1-CDF, $$CCDF(PAPR_0)=Pr\{PAPR>PAPR_0\} \quad (6)$$

The CCDF represents a probability (in %) that PAPR is larger than the specified value $PAPR_0$. The PAPR can be measured in dB units. The exemplary simulations are performed by utilizing 2000 frames, where one frame represents a plurality of OFDMA symbols.

It may be observed from the results in FIG. 9 that CyP-OFDMA system with different combinations of cyclic permutation matrices produces a lower PAPR than generic OFDM or SC-FDMA systems. The PAPR reduction is especially noticeable for BPSK modulation, as well as when the size of unitary matrix and an IDFT matrix are same. It can be also observed that the PAPR is slightly improved for higher order modulations if the x16 interpolation filter is applied after the cyclic prefix insertion (setup P6).

Figure 10:
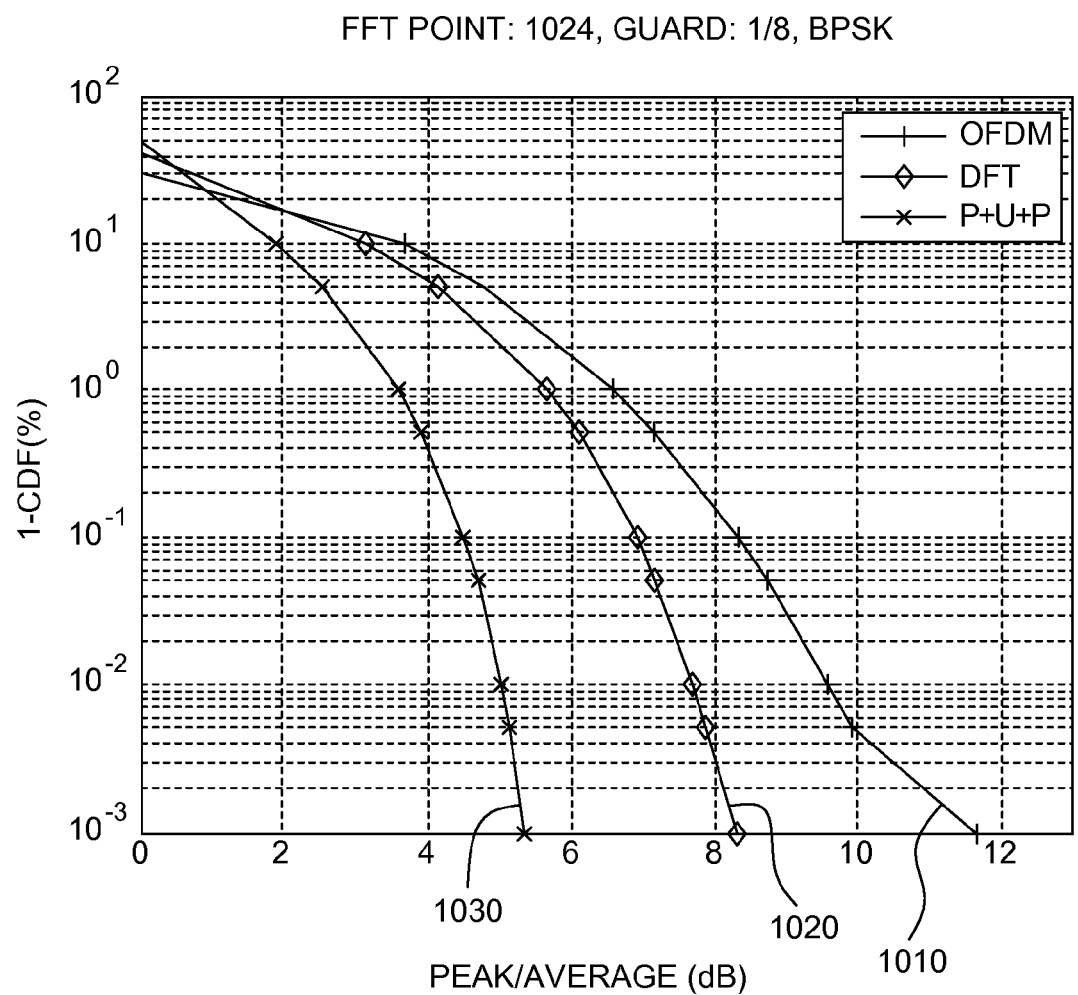
FIG. 10 illustrates a graph of example PAPR performance in OFDM, SC-FDMA and CyP-OFDMA systems with 1024-point IDFT and BPSK modulation.

FIG. 10 shows graphs of PAPR performance of OFDM, SC-FDMA and CyP-OFDMA systems with 1024-point IDFT according to one embodiment of the invention. The modulation type used for this particular exemplary simulation is BPSK, and the CP length is ⅛ of an OFDMA symbol. The 64-point DFT is utilized in the SC-FDMA transmitter, and a unitary matrix of size 64×64 (M=64) is used in the CyP-OFDMA transmitter.

Referring to FIG. 10, a curve 1010 indicates PAPR performance of a generic OFDM system without any means for PAPR performance enhancement, and a curve 1020 indicates PAPR performance in case of applying SC-FDMA system. A curve 1030 indicates PAPR performance in case of utilizing a cyclically permuted OFDMA signal generator from FIG. 5 (CyP-OFDMA system). It can be observed PAPR performance improvement of about 3 dB at 1−CDF(%)=$10^{-3}$ if the cyclic permutation is applied.

Figure 11:
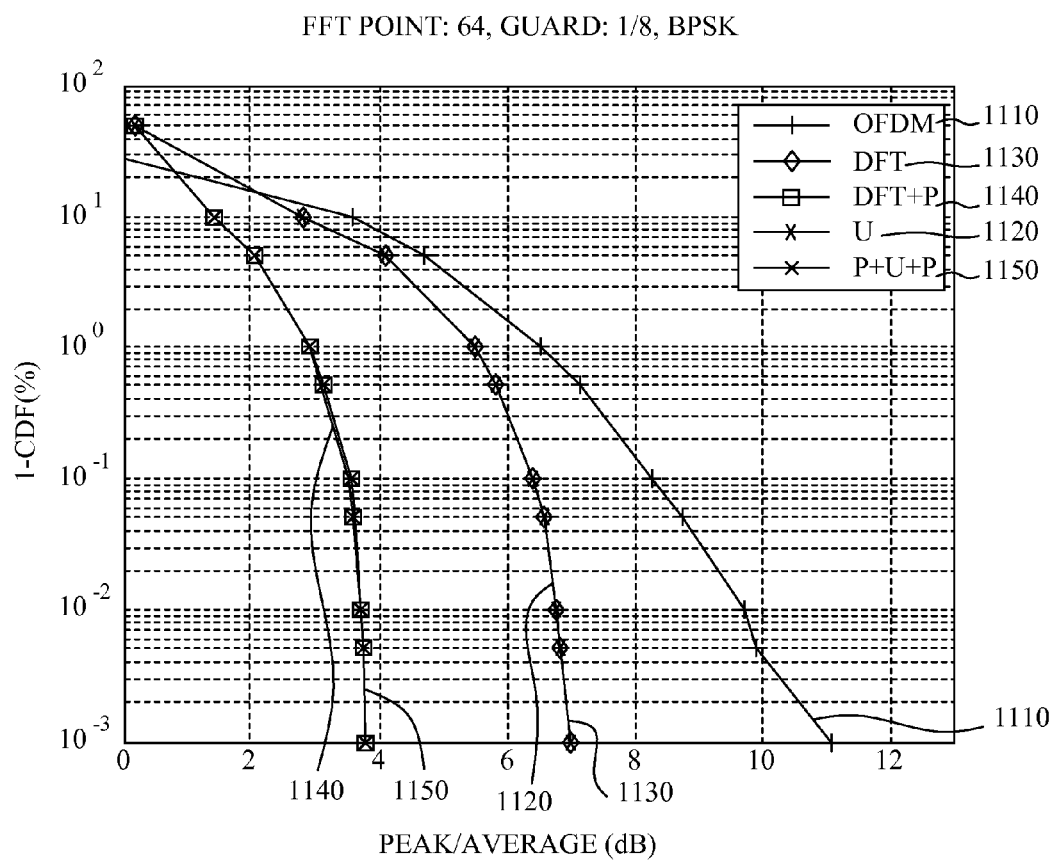
FIG. 11 illustrates a graph of example PAPR performance in OFDM, SC-FDMA and CyP-OFDMA systems with 64-point IDFT and BPSK modulation.

FIG. 11 shows a graph of PAPR performance of OFDM, SC-FDMA and CyP-OFDMA systems with 64-point IDFT according to one embodiment of the invention. The modulation type used for this particular exemplary simulation is BPSK, and the CP length is ⅛ of the OFDMA symbol. The size of utilized DFT is 64 (M=64), and the size of unitary matrix is 64×64.

Referring to FIG. 11, a curve 1110 indicates PAPR performance of a generic OFDM system with 64-point IDFT without any means for PAPR performance enhancement (setup P1 from FIG. 8 and FIG. 9), and a curve 1120 indicates PAPR performance in case of applying SC-FDMA system with a 64×64 unitary matrix instead of DFT (setup P2 from FIG. 8 and FIG. 9). A curve 1130 indicates PAPR performance in case of applying SC-FDMA with 64-point DFT (setup P3 from FIG. 8 and FIG. 9), and a curve 1140 indicates PAPR performance in case when a cyclic permutation follows the DFT (setup P4 from FIG. 8 and FIG. 9). A curve 1150 indicates PAPR performance in case when cyclic permutations are applied before and after transformation with a unitary matrix of size M×M, M=64 (setup P5 from FIG. 8 and FIG. 9). PAPR performance improvement of about 3.2 dB at 1−CDF(%)=$10^{-3}$ is achieved if a cyclic permutation is applied before and after a time-to-frequency transformation compare to the SC-FDMA system without cyclic permutations (comparing P5 simulation setup versus P3 simulation setup).

Figure 12:
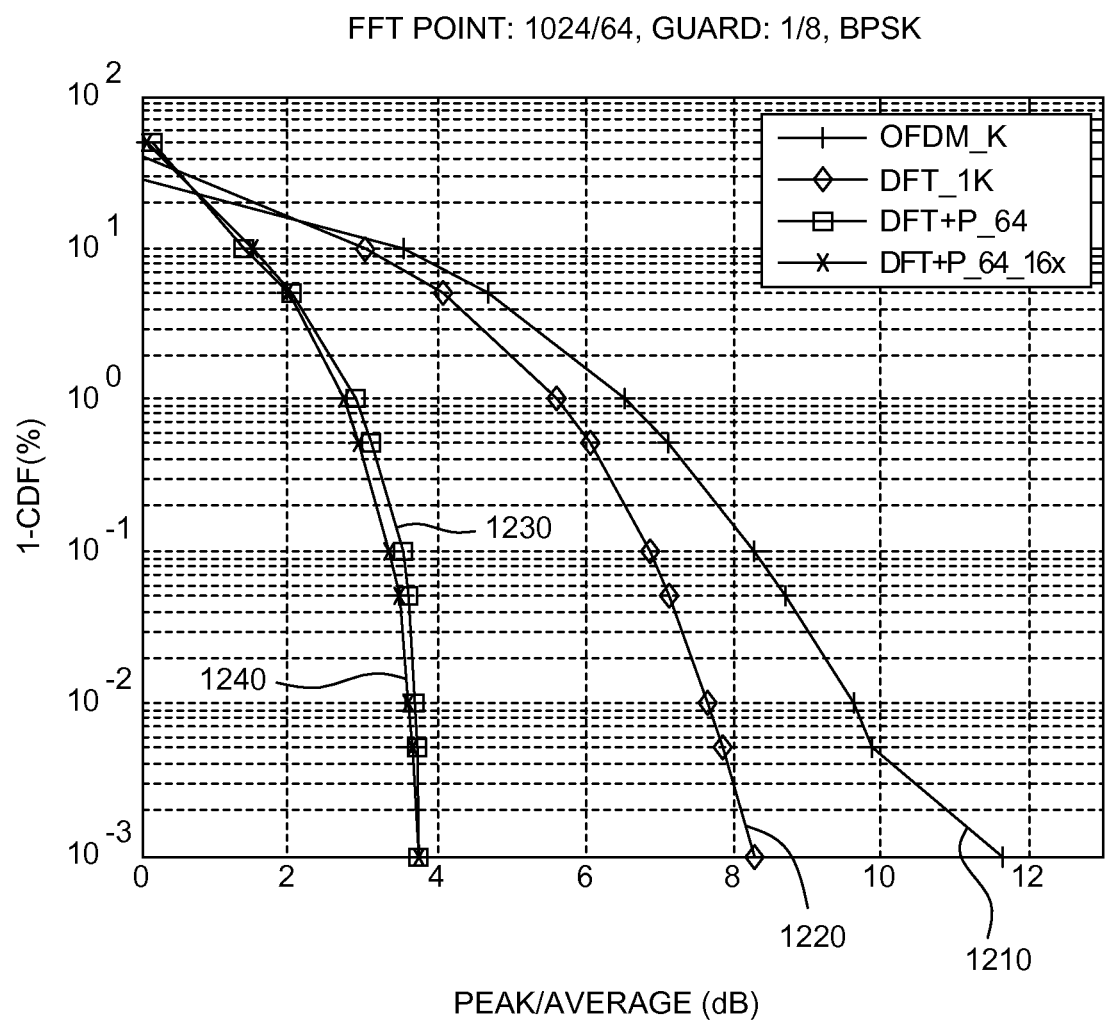
FIG. 12 illustrates a graph of example PAPR performance in OFDM, SC-FDMA and CyP-OFDMA systems with 64-point IDFT or 1024-point IDFT and BPSK modulation.

FIG. 12 shows a graph of PAPR performance of OFDM, SC-FDMA and CyP-OFDMA systems with 1024-point IDFT or 64-point IDFT according to one embodiment of the invention. The modulation type used for this particular exemplary simulation is BPSK, and the CP length is ⅛ of the OFDMA symbol. Other than for a generic OFDM system, in all other cases either 64-point DFT or a unitary matrix of size 64×64 is utilized (M=64).

Referring to FIG. 12, a curve 1210 indicates PAPR performance of a generic OFDM system with 1024-point IDFT without any means for PAPR performance enhancement (setup M1 from FIG. 8 and FIG. 9). A curve 1220 indicates PAPR performance in case of applying SC-FDMA system with 64-point DFT and 1024-point IDFT (setup M2 from FIG. 8 and FIG. 9). A curve 1230 indicates PAPR performance in case of applying a cyclic permutation after 64-point DFT, and 64-point IDFT is applied (setup P4 from FIG. 8 and FIG. 9). A curve 1240 indicates PAPR performance in case of applying a cyclic permutation after 64-point DFT, where the x16 interpolation filter follows the 64-point IDFT. It can be observed PAPR performance improvement of about 4.5 dB at 1−CDF(%)=$10^{-3}$ if a cyclic permutation is applied compare to the SC-FDMA system without a cyclic permutation (comparing P4 simulation setup versus M2 simulation setup). A reduced size IDFT (N=64) is utilized in the former case. Additional PAPR performance improvement of about 0.03 dB at 1−CDF(%)=$10^{-3}$ is achieved if the x16 interpolation filter is applied (P6 simulation setup).

As shown by the simulation results, PAPR of the SC-FDMA transmission system may be reduced if the cyclic permutations are applied on the transmission signal along with a unitary matrix transformation. Furthermore, by applying DFT (or other unitary matrix) and IDFT of the same size, PAPR may be decreased for all modulation types compare to the SC-FDMA system with DFT and IDFT of different sizes (see FIG. 9 for summarized measurement results of different simulation setups).

Figure 4A:
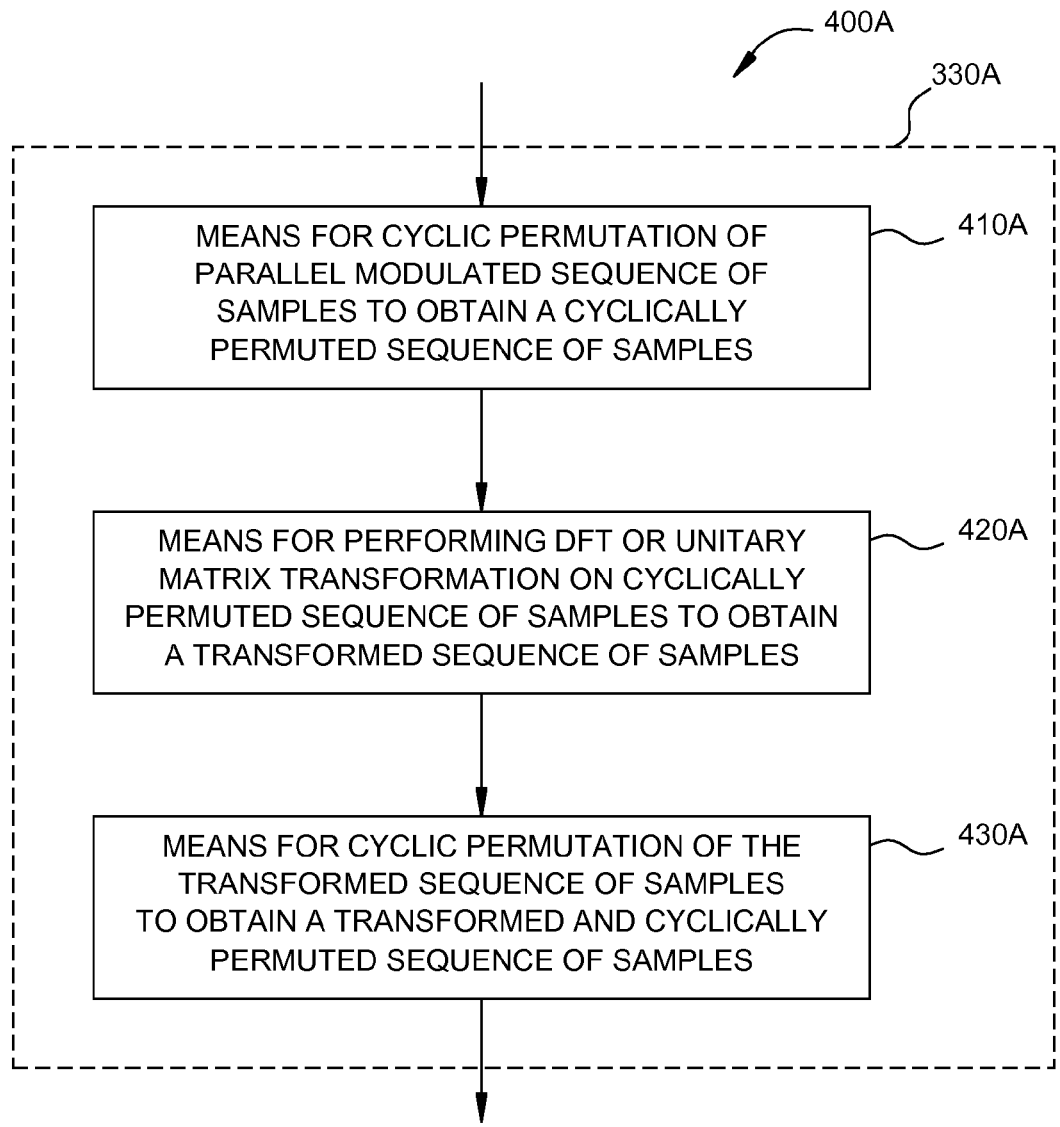
FIG. 4A illustrates example components capable of performing the operations illustrated in FIG. 4.

The various operations of methods described above may be performed by various hardware and/or software component(s) and/or module(s) corresponding to means-plus-function blocks illustrated in the Figures. For example, blocks 310-380 illustrated in FIG. 3 correspond to means-plus-function blocks 300A-380A illustrated in FIG. 3A. Similarly, blocks 410-430 illustrated in FIG. 4 correspond to means-plus-function blocks 400A-430A illustrated in FIG. 4A. More generally, where there are methods illustrated in Figures having corresponding counterpart means-plus-function Figures, the operation blocks correspond to means-plus-function blocks with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware or any combination thereof. If implemented in software, the functions may be stored as instructions or as one or more sets of instructions on a computer-readable medium or storage medium. A storage media may be any available media that can be accessed by a computer or by one or more processing devices. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray® disc where disks usually reproduce data magnetically, while discs reproduce data optically with lasers.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for transmitting data in a wireless communication system using orthogonal frequency division multiplexing (OFDM), comprising:
   performing a serial-to-parallel conversion of modulated symbols for the data to obtain a first sequence of samples;
   performing a time-to-frequency transformation of the first sequence of samples to obtain a second sequence of samples, wherein the time-to-frequency transformation comprises:
      performing a first cyclic permutation of the first sequence of samples utilizing a first cyclic permutation matrix to obtain a permuted sequence of samples;
      performing a transformation involving a unitary matrix on the permuted sequence of samples to obtain a transformed sequence of samples; and
      performing a second cyclic permutation of the transformed sequence of samples utilizing a second cyclic permutation matrix to obtain the second sequence of samples, wherein the first cyclic permutation matrix is characterized by a first index i, and the second cyclic permutation matrix is characterized by a second index j, and wherein the first index i and the second index j are each determined by simulations where a particular set of matrices are used for a particular modulation type; and
   generating an OFDM symbol for transmission from the second sequence of samples.

2. The method of claim 1, wherein the unitary matrix comprises a Vandermonde unitary matrix.

3. The method of claim 1, wherein performing the first cyclic permutation comprises performing the first cyclic permutation in a time domain.

4. The method of claim 1, wherein generating the OFDM symbol for transmission from the second sequence of samples comprises:
   mapping the second sequence of samples into a set of subcarriers to obtain a third sequence of samples;
   performing an inverse frequency-to-time transform on the third sequence of samples to obtain a fourth sequence of samples; and
   performing a parallel-to-serial conversion of the fourth sequence of samples to obtain a fifth sequence of samples for transmission as the OFDM symbol.

5. The method of claim 4, further comprising performing an interpolation using the fourth sequence of samples after performing the inverse frequency-to-time transform.

6. The method of claim 4, wherein:
   performing the transformation involving the unitary matrix on the permuted sequence of samples to obtain the transformed sequence of samples comprises performing a digital Fourier transform (DFT); and
   performing the inverse frequency-to-time transform on the third sequence of samples to obtain the fourth sequence of samples comprises performing an inverse digital Fourier transform (IDFT).

7. The method of claim 6, wherein a size of the IDFT is equal to a size of the DFT.

8. An apparatus for wireless communications using orthogonal frequency division multiplexing (OFDM), comprising:
   at least one processor configured to:
      perform serial-to-parallel conversion of modulated symbols for the data to obtain a first sequence of samples;
      perform a time-to-frequency transformation of the first sequence of samples to obtain a second sequence of samples at least in part by:
         performing a first cyclic permutation of the first sequence of samples utilizing a first cyclic permutation matrix to obtain a permuted sequence of samples;
         performing a transformation involving a unitary matrix on the permuted sequence of samples to obtain a transformed sequence of samples; and
         performing a second cyclic permutation of the transformed sequence of samples utilizing a second cyclic permutation matrix to obtain the second sequence of samples, wherein the first cyclic permutation matrix is characterized by a first index i, and the second cyclic permutation matrix is characterized by a second index j, and wherein the first index i and the second index j are each determined by simulations where a particular set of matrices are used for a particular modulation type; and
      generate an OFDM symbol for transmission from the second sequence of samples; and
   a memory coupled to the at least one processor.

9. The apparatus of claim 8, wherein the unitary matrix comprises a Vandermonde unitary matrix.

10. The apparatus of claim 8, wherein the at least one processor performs the first cyclic permutation in a time domain.

11. The apparatus of claim 8, wherein the at least one processor generates the OFDM symbol for transmission from the second sequence of samples at least in part by:
mapping the second sequence of samples into a set of subcarriers to obtain a third sequence of samples;
performing an inverse frequency-to-time transform on the third sequence of samples to obtain a fourth sequence of samples; and
performing a parallel-to-serial conversion of the fourth sequence of samples to obtain a fifth sequence of samples for transmission as the OFDM symbol.

12. The apparatus of claim 11, wherein the at least one processor is further configured to perform an interpolation using the fourth sequence of samples after performing the inverse frequency-to-time transform.

13. The apparatus of claim 11, wherein:
the at least one processor performs the transformation at least in part by performing a digital Fourier transform (DFT); and
the at least one processor performs the inverse frequency-to-time transform on the third sequence of samples at least in part by performing an inverse digital Fourier transform (IDFT).

14. The apparatus of claim 13, wherein a size of the IDFT is equal to a size of the DFT.

15. An apparatus for wireless communications using orthogonal frequency division multiplexing (OFDM), comprising:
means for performing a serial-to-parallel conversion of modulated symbols for the data to obtain a first sequence of samples;
means for performing a time-to-frequency transformation of the first sequence of samples to obtain a second sequence of samples, wherein the means for performing the time-to-frequency transformation comprises:
means for performing a first cyclic permutation of the first sequence of samples utilizing a first cyclic permutation matrix to obtain a permuted sequence of samples;
means for performing a transformation involving a unitary matrix on the permuted sequence of samples to obtain a transformed sequence of samples; and
means for performing a second cyclic permutation of the transformed sequence of samples utilizing a second cyclic permutation matrix to obtain the second sequence of samples, wherein the first cyclic permutation matrix is characterized by a first index i, and the second cyclic permutation matrix is characterized by a second index j, and wherein the first index i and the second index j are each determined by simulations where a particular set of matrices are used for a particular modulation type; and
means for generating an OFDM symbol for transmission from the second sequence of samples.

16. The apparatus of claim 15, wherein the unitary matrix comprises a Vandermonde unitary matrix.

17. The apparatus of claim 15, wherein the means for performing the first cyclic permutation is configured to perform the first cyclic permutation in a time domain.

18. The apparatus of claim 15, wherein the means for generating the OFDM symbol for transmission from the second sequence of samples is configured to:
map the second sequence of samples into a set of subcarriers to obtain a third sequence of samples;
perform an inverse frequency-to-time transform on the third sequence of samples to obtain a fourth sequence of samples; and
perform a parallel-to-serial conversion of the fourth sequence of samples to obtain a fifth sequence of samples for transmission as the OFDM symbol.

19. The apparatus of claim 18, further comprising means for performing an interpolation using the fourth sequence of samples after performing the inverse frequency-to-time transform.

20. The apparatus of claim 18, wherein:
the means for performing the transformation involving the unitary matrix on the permuted sequence of samples to obtain the transformed sequence of samples is configured to perform a digital Fourier transform (DFT); and
the means for performing the inverse frequency-to-time transform on the third sequence of samples to obtain the fourth sequence of samples is configured to perform an inverse digital Fourier transform (IDFT).

21. The apparatus of claim 20, wherein a size of the IDFT is equal to a size of the DFT.

22. A computer-program product for processing data for transmission in a wireless communication system using orthogonal frequency division multiplexing (OFDM) comprising a non-transitory computer readable medium having a set of instructions stored thereon, the set of instructions being executable by one or more processors and the set of instructions comprising:
instructions for performing a serial-to-parallel conversion of modulated symbols for the data to obtain a first sequence of samples;
instructions for performing a time-to-frequency transformation of the first sequence of samples to obtain a second sequence of samples, wherein the instructions for performing the time-to-frequency transformation comprise:
instructions for performing a first cyclic permutation of the first sequence of samples utilizing a first cyclic permutation matrix to obtain a permuted sequence of samples;
instructions for performing a transformation involving a unitary matrix on the permuted sequence of samples to obtain a transformed sequence of samples; and
instructions for performing a second cyclic permutation of the transformed sequence of samples utilizing a second cyclic permutation matrix to obtain the second sequence of samples, wherein the first cyclic permutation matrix is characterized by a first index i, and the second cyclic permutation matrix is characterized by a second index j, and wherein the first index i and the second index j are each determined by simulations where a particular set of matrices are used for a particular modulation type; and
instructions for generating an OFDM symbol for transmission from the second sequence of samples.

23. The computer-program product medium of claim 22, wherein the unitary matrix comprises a Vandermonde unitary matrix.

24. The computer-program product medium of claim 22, wherein the instructions for performing a first cyclic permutation comprise instructions for performing the first cyclic permutation in a time domain.

25. The computer-program product of claim 22, wherein the instructions for generating the OFDM symbol for transmission from the second sequence of samples comprise:

instructions for mapping the second sequence of samples into a set of subcarriers to obtain a third sequence of samples;

instructions for performing an inverse frequency-to-time transform on the third sequence of samples to obtain a fourth sequence of samples; and instructions for performing a parallel-to-serial conversion of the fourth sequence of samples to obtain a fifth sequence of samples for transmission as the OFDM symbol.

26. The computer-program product of claim 25, wherein the set of instructions further comprise instructions for performing an interpolation using the fourth sequence of samples after performing the inverse frequency-to-time transform.

27. The computer-program product of claim 25, wherein:
the instructions for performing the transformation involving the unitary matrix on the permuted sequence of samples to obtain the transformed sequence of samples comprise instructions for performing a digital Fourier transform (DFT); and
the instructions for performing the inverse frequency-to-time transform on the third sequence of samples to obtain the fourth sequence of samples comprise instructions for performing an inverse digital Fourier transform (IDFT).

28. The computer-program product of claim 27, wherein a size of the IDFT is equal to a size of the DFT.

29. A method for transmitting data in a wireless communication system using orthogonal frequency division multiplexing (OFDM), comprising:
performing a serial-to-parallel conversion of modulated symbols for the data to obtain a first sequence of samples;
performing a time-to-frequency transformation of the first sequence of samples to obtain a second sequence of samples, wherein the time-to-frequency transformation comprises:
performing a first cyclic permutation of the first sequence of samples utilizing a first cyclic permutation matrix to obtain a permuted sequence of samples;
performing a transformation involving a unitary matrix on the permuted sequence of samples to obtain a transformed sequence of samples; and
performing a second cyclic permutation of the transformed sequence of samples utilizing a second cyclic permutation matrix to obtain the second sequence of samples, wherein the first cyclic permutation matrix is characterized by a first index i, and the second cyclic permutation matrix is characterized by a second index j, and wherein the first index i and the second index j are each determined by selecting values that result in minimum peak-to-average power ratio (PAPR) values for a particular modulation type; and
generating an OFDM symbol for transmission from the second sequence of samples.

30. An apparatus for wireless communications using orthogonal frequency division multiplexing (OFDM), comprising:
at least one processor configured to:
perform serial-to-parallel conversion of modulated symbols for the data to obtain a first sequence of samples;
perform a time-to-frequency transformation of the first sequence of samples to obtain a second sequence of samples at least in part by:
performing a first cyclic permutation of the first sequence of samples utilizing a first cyclic permutation matrix to obtain a permuted sequence of samples;
performing a transformation involving a unitary matrix on the permuted sequence of samples to obtain a transformed sequence of samples; and
performing a second cyclic permutation of the transformed sequence of samples utilizing a second cyclic permutation matrix to obtain the second sequence of samples, wherein the first cyclic permutation matrix is characterized by a first index i, and the second cyclic permutation matrix is characterized by a second index j, and wherein the first index i and the second index j are each determined by selecting values that result in minimum peak-to-average power ratio (PAPR) values for a particular modulation type; and
generate an OFDM symbol for transmission from the second sequence of samples; and
a memory coupled to the at least one processor.

31. An apparatus for wireless communications using orthogonal frequency division multiplexing (OFDM), comprising:
means for performing a serial-to-parallel conversion of modulated symbols for the data to obtain a first sequence of samples;
means for performing a time-to-frequency transformation of the first sequence of samples to obtain a second sequence of samples, wherein the means for performing the time-to-frequency transformation comprises:
means for performing a first cyclic permutation of the first sequence of samples utilizing a first cyclic permutation matrix to obtain a permuted sequence of samples;
means for performing a transformation involving a unitary matrix on the permuted sequence of samples to obtain a transformed sequence of samples; and
means for performing a second cyclic permutation of the transformed sequence of samples utilizing a second cyclic permutation matrix to obtain the second sequence of samples, wherein the first cyclic permutation matrix is characterized by a first index i, and the second cyclic permutation matrix is characterized by a second index j, and wherein the first index i and the second index j are each determined by selecting values that result in minimum peak-to-average power ratio (PAPR) values for a particular modulation type; and
means for generating an OFDM symbol for transmission from the second sequence of samples.

32. A computer-program product for processing data for transmission in a wireless communication system using orthogonal frequency division multiplexing (OFDM) comprising a non-transitory computer readable medium having a set of instructions stored thereon, the set of instructions being executable by one or more processors and the set of instructions comprising:
instructions for performing a serial-to-parallel conversion of modulated symbols for the data to obtain a first sequence of samples;
instructions for performing a time-to-frequency transformation of the first sequence of samples to obtain a second sequence of samples, wherein the instructions for performing the time-to-frequency transformation comprise:

instructions for performing a first cyclic permutation of the first sequence of samples utilizing a first cyclic permutation matrix to obtain a permuted sequence of samples;

instructions for performing a transformation involving a unitary matrix on the permuted sequence of samples to obtain a transformed sequence of samples; and instructions for performing a second cyclic permutation of the transformed sequence of samples utilizing a second cyclic permutation matrix to obtain the second sequence of samples, wherein the first cyclic permutation matrix is characterized by a first index i, and the second cyclic permutation matrix is characterized by a second index j, and wherein the first index i and the second index j are each determined by selecting values that result in minimum peak-to-average power ratio (PAPR) values for a particular modulation type; and instructions for generating an OFDM symbol for transmission from the second sequence of samples.

* * * * *